Oct. 2, 1934.  J. J. KENNEY ET AL  1,975,578
WELDING MACHINE
Filed April 20, 1933

Inventors:
John J. Kenney;
Ralph A. Gilbert,
by Charles E. Tullar
Their Attorney.

Patented Oct. 2, 1934

1,975,578

UNITED STATES PATENT OFFICE 1,975,578

WELDING MACHINE

John J. Kenney and Ralph A. Gilbert, Pittsfield, Mass., assignors to General Electric Company, a corporation of New York Application April 20, 1933, Serial No. 667,034

21 Claims. (Cl. 219—8)

Our invention relates to automatic welding machines.

It is an object of our invention to provide a machine of improved construction for welding seams that extend part way about an object having flat and curved surfaces.

It is a further object of our invention to provide a machine for welding seams formed of angularly disposed straight portions connected by curved portions as if they were straight seams of a length equivalent to the combined lengths of the straight and curved portions.

It is a further object of our invention to provide a machine in which the welding means is traversed along a predetermined path of travel and in which means are provided for presenting progressively in the line of travel of the welding means a seam which does not lie wholly in this line of travel.

It is a further object of our invention to provide a machine in which the welding means is movable in a predetermined plane and in which means are provided for progressively presenting to the welding means in said plane a seam which does not lie wholly in said plane.

It is a further object of our invention to provide a machine in which the welding means is traversed along a predetermined path of travel at a uniform rate of speed, and in which the straight portions of a seam formed of straight and curved portions are successively located in the line of travel of the welding means and the curved portions are rotated relatively to the welding means in a manner to present them as straight seams in the path of travel of the welding means.

Figure 1:
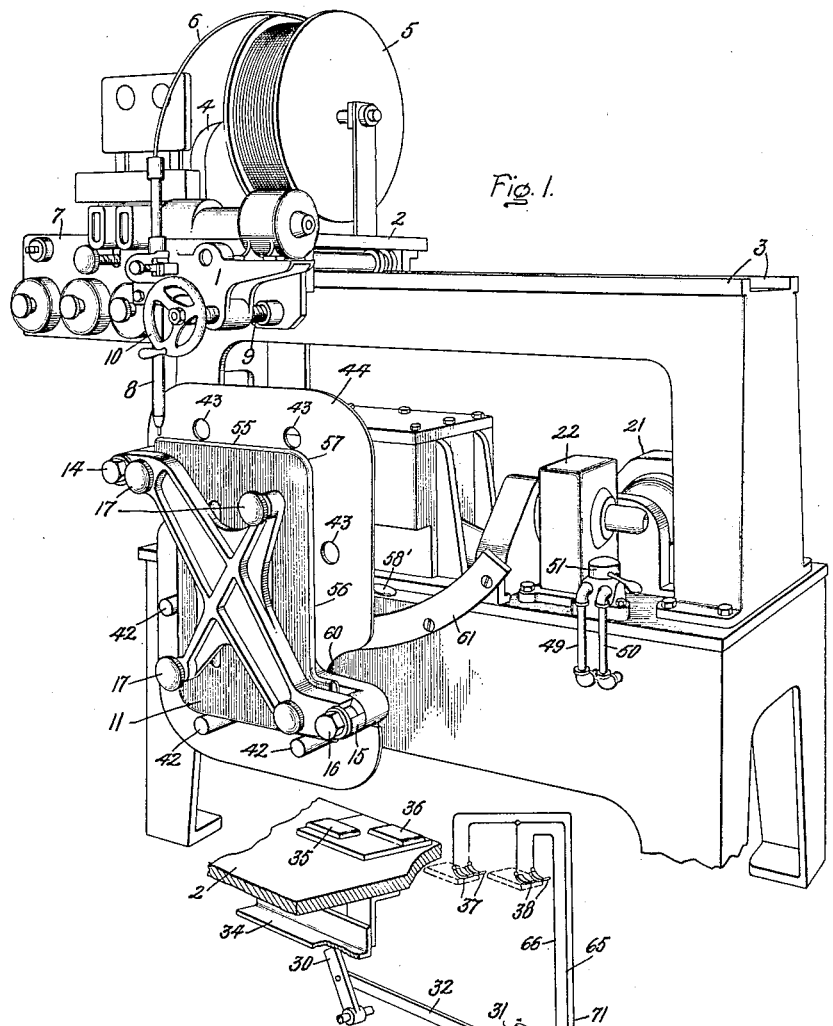
Figure 2:
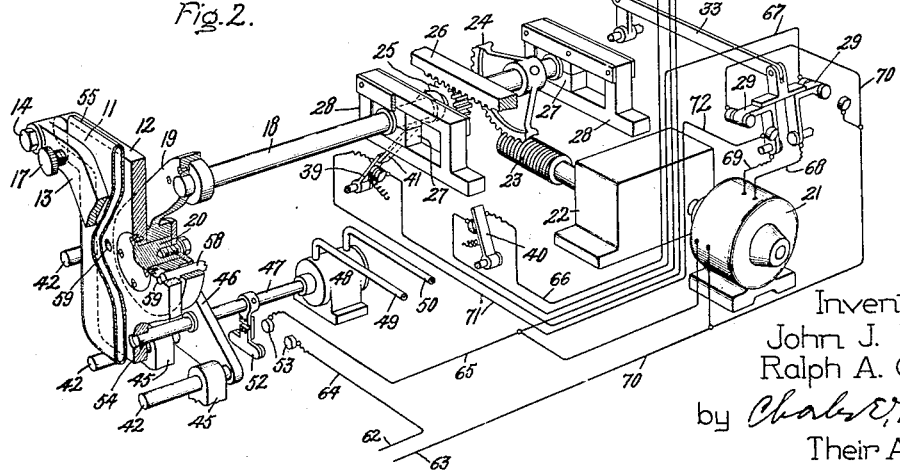

Further objects of our invention will become apparent from a consideration of the following description taken in connection with the accompanying drawing, Fig. 1 of which shows in perspective one embodiment of our invention, and Fig. 2 of which diagrammatically discloses the construction of this embodiment by means of which the above stated objects are accomplished.

In the embodiment of our invention illustrated in the drawing the welding means 1 is traversed along a predetermined path of travel by means of a supporting carriage 2 which is carried on a track 3 forming part of the welding machine. The carriage also supports a travel motor 4 by means of which it is propelled, a reel 5 of welding material 6 and a control panel 7. In the arrangement illustrated the welding means comprises an automatic device for feeding electrode material 6 through a nozzle 8 toward and away from the work to strike and thereafter maintain a welding arc of predetermined length. The construction of such welding means is well known and will not be further described. The welding means may be moved at right angles to the direction of travel of the carriage 2 through the agency of an adjusting screw 9 provided with a hand-wheel 10. This cross adjustment in combination with the path of travel defined by the track 3 provides means for moving the welding means in a predetermined plane defined thereby.

The work 11 illustrated as a heat absorber for a water tube boiler is held on a work holder 12 by means of a clamp 13. This clamp is pivotally supported at 14 to the work holder and latched at 15 to a bolt 16 supported by the work holder 12. The particular clamp illustrated is of X-shape and is provided with adjusting screws 17 for uniformly distributing the clamp pressure at its several extremities to the work supported on the work holder.

The work holder 12 is supported on a shaft 18 through the agency of a cranklike member 19, to which the support 12 is pivotally attached at 20. Means are provided for rotating and translating the shaft 18 in the direction of travel of the welding means. This means comprises a motor 21 connected through a gear reduction 22 to a worm 23, a worm-wheel 24 and a gear 25 both of which are supported on the shaft 18 and a rack 26 which meshes with gear 25 and is supported on a stationary portion of the machine. To permit this rotary and translatory movement of the shaft 18 it is supported in bearing blocks 27 which are slidably supported in frames 28 for motion in the direction of travel of the welding means.

The direction of rotation of the motor 21 is determined by a reversing switch 29 which is operated by pivotally supported levers 30 and 31 connected thereto by links 32 and 33. The end-portions of levers 30 and 31 are in the path of travel of an operating member 34 which is attached to the travel carriage upon which the welding means is supported. The travel carriage also supports a plurality of relatively adjustable contacts 35 and 36, which cooperate with a plurality of fixed contacts 37 and 38 connected in the armature circuit of the motor 21. Limit switches 39 and 40 which are operated by an arm 41 attached to the shaft 18 are also provided in the armature circuit of the motor 21.

The work 11 is located on the work holder 12 by means of a plurality of pins 42. These pins extend through openings 43 in a shield 44 interposed between the work holder and the machine for preventing spattered weld metal from falling on the machine structures. The pins 42 are held in proper position by guides 45 and are moved in unison by a connecting member 46 which is connected through a rod 47 to a motor 48. In the particular arrangement illustrated this operating motor is a pneumatic motor comprising a piston and a cylinder to which air under pressure is supplied through pipes 49 and 50 under the control of a valve mechanism 51. Attached to rod 47 is a contact member 52 which cooperates with stationary contacts 53 located in the armature circuit of the motor 21. Contacts 52 and 53 are brought into engagement with one another and complete a circuit to the armature of the motor 21 when locating pins 42 are moved to an inoperative position through the agency of rod 47 and motor 48.

When the locating pins 42 are in an operative position, rotation of the work holder 12 is prevented by a locking pin 54 which is supported on member 46 and extends through openings in the work holder 12. The work as illustrated in the drawing is of symmetrical configuration and presents for welding two angular seams formed of straight portions 55 and 56 connected by a curved portion 57. The pins 42 are provided for locating the work on holder 12 in such a position that one of the straight seams 55 or 56 is located in the path of travel of the welding means, and that the axis of the shaft 18 extends through the center of curvature of the curved portion 57. In the arrangement illustrated the curved portion comprises an arc of a circle and its center of curvature is the center of a circle of which this arc forms a part.

When welding work parts of symmetrical configuration such as the work part illustrated in the drawing, it is possible to rotate the work holder about its pivot 20 and present a second seam for welding without removing the work from the work holder. The work holder 12 is held in the desired number of positions by means of a pin 58 which is adapted to engage holes 59 in the work holder 12 and lock it against relative motion about its pivot 20 with regard to the supporting member 19 by means of which it is attached to the shaft 18. The pin 58 may be moved from or to locking engagement with the holes 59 in work holder 12 by means of a handle 58'. To facilitate this indexing operation the shield 44 is provided with notches 60 through which the nozzle of the welding means may be moved to a non-interfering position in back of the shield when the work holder is rotated about its pivot 20 for accomplishing this indexing operation.

The lower portion of the work holder 12 is supported by a bearing 61 by means of which the inward thrust thereof is transferred to the frame of the machine. This permits the shaft 18 and connecting member 19 to be made of a less rigid construction than would otherwise be necessary if such a bearing were not provided.

The relative arrangement of the parts above described will become apparent from a consideration of the operation of the machine which is as follows:—If the work holder 12 is in the position illustrated in the drawing, locating pins 42 may be placed in an operative position through the agency of motor 48 which is under the control of operating valve 51. When the pins 42 are in their operative position the work holder 12 is locked against rotary motion by means of pin 54. The work 11 is then placed upon the holder 12 and held thereon by clamp 13. The locating pins 42 may then be moved to an inoperative position and their movement to this position also moves the locking pin 54 to an inoperative position thereby adapting the work holder for rotary motion about the axis of shaft 18. The movement of the pins 42 to an inoperative position also completes the electrical circuit of the motor 21 through contacts 52 and 53. If the welding means is in the position illustrated in the drawing the welding operation may be then initiated by initiating movement of the welding carriage 2 along the track 3 by means of which this welding means is traversed relative to the work along a predetermined path of travel.

When the welding means arrives at the curved portion 57 of the seam being welded, the motor 21 is connected to its source of supply 62, 63 through contacts 36 and 38 as follows:—From terminal 62 of the source of supply through conductor 64, contacts 52 and 53, conductor 65, contacts 36 and 38, conductor 66, limit switch 40, conductor 67, switch 29, conductor 68, armature of the motor 21, conductor 69, switch 29 and conductor 70 to the opposite terminal 63 of the source of supply. The rotation of the motor 21 will rotate shaft 18 and gear 25 located thereon through the agency of worm 23 and worm-wheel 24. By reason of the engagement of gear 25 with stationary rack 26, the shaft 18 and work holder 12 will be translated in the direction of travel of the welding means at the same time that they are rotated about the axis of the shaft 18. During this operation the worm-wheel 24 travels along the stationary worm 23. When the welding means has completed welding the curved portion 57 of the seam, arm 41 attached to shaft 18 will operate the limit switch 40 and interrupt the operation of the motor 21. Rotation of the work holder has placed the straight portion of the seam 56 in the path of travel of the welding means, and the welding operation is performed as if the angularly disposed portions 55 and 56 thereof as well as the curved portion 57 were a straight seam of equivalent length. After welding the curved portion 57 of the seam the motion of the travel carriage through operating member 34 and pivotally supported lever 31 moves the reversing switch 29 to a position in which the motor 21 is adapted for reverse rotation.

When the straight portion 56 of this seam has been welded, the welding means is moved through the notch 60 in the shield 44 to a position permitting rotary motion of the work holder 12 about its pivot 20 by means of which a straight portion of a second seam having a configuration like the seam just welded is placed in the line of travel of the welding means. The travel carriage is then moved in the reverse direction and welding proceeds in the reverse direction along this second seam. When the welding means approaches the curved portion of the new seam, the motor 21 is connected to the source of supply 62, 63 through contacts 35 and 37 through the following circuit. From terminal 62 of the source of supply through conductor 64, contacts 52 and 53, conductor 65, contacts 35 and 37, conductor 71, limit switch 39, conductor 72, reversing switch 29, conductor 69, armature of motor 21, conductor 68, reversing switch 29 and conductor 70. Operation of the motor 21 rotates the work support about the center of curvature of the curved portion of the seam and translates the work part in the direction of travel of the welding means in the same manner as above described in connection with the above operation of the machine, of which the present operation is merely a reverse operation. Upon continued travel of the welding means to the left the reversing switch 29 is again operated to a position adapting motor 21 for reverse rotation.

From the above description it will be apparent that a machine having the construction described above is of greatest utility when welding objects having a plurality of seams of symmetrical configuration, so that the same welding operation may be performed during the forward and reverse travel of the welding means along the path predetermined for it by the construction of the machine. However, the machine is likewise useful for welding seams which extend part way around an object having flat and curved circuits in which the straight portions of the seams are angularly disposed to one another and connected by a curved portion. In the arrangement illustrated and described the welding means is traversed along its predetermined path of travel at a uniform rate of speed. For some welding operations the travel of this welding means may be interrupted. The welding operation may also be interrupted and the machine thus employed utilized for welding a plurality of straight seams which are angularly disposed to one another and through the agency of the machine successively presented in the path of travel of the welding means. The path of travel of the welding means in the machine illustrated may be confined to a straight line determined by the tracks 3, which in the machine illustrated are straight. These tracks may, however, be curved in order to traverse the welding machine along a curved path of travel, or this result may be accomplished by operation of the adjusting screw 9 by means of which the welding head is moved transversely to the line of travel determined by track 3. The detailed construction of the machine may be modified without departing from our invention, and it is to be understood that the embodiment illustrated and described has been used solely for disclosing our invention and in no way limits the scope of our invention, for we seek to cover in the appended claims all those modifications which fall within the true spirit and scope of our invention.

What we claim as new and desire to secure by Letters Patent of the United States is:

1. Apparatus comprising welding means, means for moving said welding means along a predetermined straight path of travel, and means for successively presenting straight and curved seams in the path of travel of said welding means.

2. Welding apparatus comprising means for welding, means for moving said welding means along a predetermined path of travel, and means for presenting progressively in the path of travel of said welding means a seam which does not lie wholly in said line of travel.

3. Welding apparatus comprising means for welding, means for moving said welding means in a predetermined plane, and means for progressively presenting to said welding means in said plane a seam which does not lie wholly in the path of movement of said welding means.

4. Apparatus for welding means having straight and curved portions comprising means for welding, means for traversing said welding means along a straight path of travel, and means for successively presenting the straight and curved portions of said seam in said path of travel.

5. Welding apparatus comprising means for welding, means for predetermining the path of travel of said welding means, means for presenting progressively in the path of travel of said welding means a seam which does not lie wholly in said line of travel, and means for moving said welding means and said seam relatively to one another at a predetermined rate of speed.

6. Apparatus for welding seams having straight portions interconnected by a curved portion comprising means for welding, means for traversing said welding means along a straight path of travel, means movable to positions for holding each of said straight portions of said seam in the path of travel of said welding means, and means for moving said holding means from one position to another and for presenting said curved portion of said seam as a continuation in the path of travel of said welding means of said straight portions of said seam.

7. Apparatus for welding seams having straight and curved portions comprising means for welding, means for traversing said welding means along a straight path of travel, means for holding a straight portion of said seam in the path of travel of said welding means, and means, including said holding means, for presenting the curved portion of said seam in the path of travel of said welding means.

8. Apparatus for welding seams having interconnected straight and curved portions comprising means for welding, means for predetermining a straight path of travel for said welding means, means for holding a straight portion of said seam in the path of travel of said welding means, means including said holding means for presenting a curved portion of said seam as a continuation in the path of travel of said welding means of the straight portion thereof, and means for moving said welding means and said seam relatively to one another at a predetermined uniform rate of speed.

9. Apparatus for welding seams having straight portions connected by a curved portion comprising means for welding, means for moving said welding means at a uniform rate of speed along a predetermined path of travel, means movable to positions for holding stationary each of said straight portions of said seam in the path of travel of said welding means, and means for moving said holding means from one of said stationary positions to another of said stationary positions and for simultaneously presenting said curved portion of said seam as a stationary straight seam in the path of travel of said welding means.

10. Apparatus for welding seams having straight portions connected by a curved portion comprising means for welding, means for traversing said welding means along a straight path of travel, means movable to positions for holding each of said straight portions of said seam in the path of travel of said welding means, and means for traversing said holding means in the direction of travel of said welding means and for simultaneously rotating said holding means from a position in which a straight portion of the seam corresponds to the path of travel of said welding means to another position in which another straight portion of the seam likewise corresponds to the path of travel of said welding means.

11. Apparatus for welding seams having straight portions connected by a curved portion comprising means for welding, means for moving said welding means along a predetermined path of travel, means movable to positions for holding stationary each of said straight portions of said seam in the path of travel of said welding means, and means responsive to the movement of said welding means along said predetermined path of travel for moving said holding means from one of said stationary positions to another of said stationary positions.

12. Apparatus for welding seams having straight portions connected by a circular arcuate portion comprising means for welding, means movable to positions for holding stationary each of the straight portions of said seam in the path of travel of said welding, and means responsive to the movement of said welding means along said predetermined path of travel for rotating said holding means from one of said stationary positions to another of said stationary positions about the center of curvature of the arcuate portion of said seam.

13. Apparatus for welding seams having straight portions connected by a circular arcuate portion comprising means for welding, means for traversing said welding means along a predetermined path of travel, means movable to positions for holding stationary each of the straight portions of said seam in the path of travel of said welding means, means responsive to the movement of said welding means for initiating a rotary motion of said holding means about the center of curvature of the arcuate portion of said seam when the welding means arrives at said arcuate portion, and means for arresting said rotary motion when said welding means has welded the arcuate portion of said seam.

14. Apparatus for welding seams having straight portions connected by circular arcuate portions comprising means for welding, means for traversing said welding means at a uniform rate of speed along a straight path of travel, means movable to positions for holding stationary each of said straight portions of said seam in the path of travel of said welding means, and means for traversing said holding means in the direction of travel of said welding means at the same rate of speed as said welding means and for simultaneously rotating said holding means from one of said stationary positions to another of said stationary positions about the center of curvature of the arcuate portion of said seam.

15. Apparatus for successively welding straight and curved seams comprising welding means, means for moving said welding means along a predetermined path of travel, a rotatable work holder, means for locating work on said work holder with a straight seam in the line of travel of said welding means and with the center of curvature of a curved seam corresponding to the center of rotation of said work holder, means for moving said locating means into and out of operative position, means for holding said work holder against rotation only when said locating means is in operative position, means responsive to the movement of said welding means for initiating a rotary motion of said holding means about the center of curvature of the curved portion of said seam and means for arresting said rotary motion after a predetermined movement.

16. Apparatus for welding work parts having seams composed of straight and curved portions comprising welding means, means for moving said welding means in opposite directions along a predetermined path of travel, means for holding the straight portions of said seams in the line of travel of said welding means, means for rotating said holding means about the centers of curvature of the curved portions of said seams and for presenting said curved portions in the path of travel of said welding means, means independently adjustable for each direction of travel of said welding means for starting said rotating means at predetermined points in the path of travel of said welding means, and means for adapting said rotating means for motion in the opposite direction prior to movement of said welding means in the opposite direction.

17. Apparatus for welding work parts having a plurality of seams composed of straight and curved portions comprising welding means, means for moving said welding means in opposite directions along a predetermined path of travel, means for holding the straight portions of said seams in the line of travel of said welding means, means independently adjustable for each direction of travel of said welding means for rotating said holding means about the center of curvature of that portion of a seam connected to a straight portion thereof and for presenting said curved portion in the path of travel of said welding means, means for adjusting said holding means to a plurality of positions for placing a plurality of seams in the line of travel of said welding means, means for arresting the operation of said rotating means in either direction upon the completion of the welding of a curved portion of a seam, and means for adapting said rotating means for reverse rotation upon the completion of the welding of a curved portion of a seam.

18. Apparatus for welding seams having straight portions connected by a circular arcuate portion comprising means for welding, means for moving said welding means along a predetermined path of travel, a work holder, a shaft, means for connecting said shaft to said work holder, means for clamping the work on said holder with a straight portion of a seam in the line of travel of said welding means and with the axis of said shaft extending through the center of curvature of an arcuate portion thereof, means for rotating and translating said shaft in the direction of travel of said welding means and for presenting a curved portion of said seam as a straight seam in the path of travel of said welding means, means for initiating the rotation of said rotating means when said welding means arrives at the arcuate portion of a seam, and means for arresting the operation of said rotating means upon the completion of the welding of said arcuate portion.

19. Apparatus for welding seams having straight portions connected by a curved portion comprising means for welding, means for traversing said welding means at a uniform rate of speed along a straight path of travel, a work support, means for holding the work on said support with one of its straight seams in the path of travel of said welding means, a shaft, means for connecting said shaft to said work support with the axis of said shaft extending through the center of curvature of the curved portion of a seam to be welded, means for rotating said shaft and simultaneously translating it in the direction of travel of said welding means, means for initiating the rotation and translation of said shaft when said welding means arrives at the arcuate portion of the seam, and means for arresting said motion of said shaft when another straight portion of the seam has been located in the path of travel of said welding means.

20. Apparatus for welding seams having two straight portions connected by a circular arcuate portion comprising means for welding, means for moving said welding means at a uniform rate of speed along a predetermined path of travel, a work holder, a shaft, means for connecting said shaft to said work holder, means for clamping the work on said holder with a straight portion of a seam in the line of travel of said welding means and with the axis of said shaft extending through the center of curvature of the arcuate portion of a seam, a gear of the same radius as the arcuate portion of said seam mounted on said shaft, a stationary rack cooperating with said gear, means including a motor, a worm driven by said motor and a worm wheel attached to said shaft for rotating said gear and translating said work holder in the direction of travel of said welding means at the same rate of speed as said welding means, means responsive to the movement of said welding means for initiating the operation of said motor when said welding means arrives at the arcuate portion of the seam, and means for arresting the operation of said motor when another straight portion of the seam has been located in the path of travel of said welding means.

21. Apparatus for welding seams having straight portions connected by a circular arcuate portion comprising means for welding, means for moving said welding means at a uniform rate of speed along a predetermined path of travel, a work holder, a shaft, means connecting said shaft to said work holder, means for clamping the work on said holder with the straight portion of a seam in the line of travel of said welding means and with the axis of said shaft extending through the center of curvature of the arcuate portion thereof, a gear having a radius equal to the radius of curvature of the arcuate portion of the seam mounted on said shaft, a stationary rack cooperating with said gear, means including a motor, a worm driven by said motor and a worm wheel attached to said shaft, for rotating said gear and simultaneously moving said work holder in the direction of travel of said welding means at the same rate of speed as said welding means, means for locating the work on said holder, means for moving said locating means into and out of operative position, means for preventing the operation of said motor only when said locating means is in an operative position, means responsive to the movement of said welding means for initiating the operation of said motor when said welding means arrives at the arcuate portion of a seam, and means for arresting the operation of said motor upon the completion of the welding of said arcuate portion.

JOHN J. KENNEY.
RALPH A. GILBERT.

CERTIFICATE OF CORRECTION.

Patent No. 1,975,578.  October 2, 1934.

JOHN J. KENNEY, ET AL.

It is hereby certified that error appears in the printed specification of the above numbered patent requiring correction as follows: Page 3, line 67, claim 4, for "means" read seams; and that the said Letters Patent should be read with this correction therein that the same may conform to the record of the case in the Patent Office.

Signed and sealed this 30th day of October, A. D. 1934.

Leslie Frazer
(Seal)  Acting Commissioner of Patents.